US006833650B2

(12) United States Patent
Hara et al.

(10) Patent No.: US 6,833,650 B2
(45) Date of Patent: Dec. 21, 2004

(54) PLANE COMMUTATOR OF MOTOR HAVING A BASE MADE OF CONDUCTIVE POWDER

(75) Inventors: Yusuke Hara, Kariya (JP); Syouichi Takenouchi, Toyota (JP); Satoshi Sugiyama, Toyohashi (JP); Masahiro Takahama, Chita-gun (JP); Kenzo Kiyose, Takahama (JP); Yoshihiro Teramoto, Okazaki (JP); Noboru Yoshikawa, Matsusaka (JP)

(73) Assignees: DENSO Corporation, Kariya (JP); TRIS Inc., Matsusaka (JP)

( * ) Notice: Subject to any disclaimer, the term of this patent is extended or adjusted under 35 U.S.C. 154(b) by 61 days.

(21) Appl. No.: 09/873,406

(22) Filed: Jun. 5, 2001

(65) Prior Publication Data

US 2003/0094877 A1 May 22, 2003

(30) Foreign Application Priority Data

Jun. 8, 2000 (JP) ...................................... 2000-172205

(51) Int. Cl.[7] ........................ H01R 39/16; H01R 39/52; H01R 39/04; H02K 13/04

(52) U.S. Cl. ........................ 310/233; 310/237; 310/235

(58) Field of Search ................................ 310/233, 234, 310/235, 237, 238, 236; 29/597, 596

(56) References Cited

U.S. PATENT DOCUMENTS

| | | | | | |
|---|---|---|---|---|---|
| 5,157,299 | A | | 10/1992 | Gerlach | 310/237 |
| 5,400,496 | A | * | 3/1995 | Kemmner et al. | 29/597 |
| 5,629,576 | A | * | 5/1997 | Shimoyama | 310/237 |
| 5,789,842 | A | * | 8/1998 | Steinbach et al. | 310/233 |
| 5,925,961 | A | | 7/1999 | Sugiyanma | 310/237 |
| 5,932,949 | A | * | 8/1999 | Ziegler et al. | 310/236 |
| 6,222,298 | B1 | * | 4/2001 | Saito et al. | 310/233 |
| 6,242,838 | B1 | * | 6/2001 | Kiyose et al. | 310/233 |
| 6,259,183 | B1 | * | 7/2001 | Hotta et al. | 310/233 |
| 2001/0024074 | A1 | * | 9/2001 | Kiyose et al. | 310/237 |
| 2001/0030485 | A1 | * | 10/2001 | Kiyose et al. | 310/233 |

FOREIGN PATENT DOCUMENTS

| | | |
|---|---|---|
| JP | 7-42223 | 9/1995 |

* cited by examiner

*Primary Examiner*—Nestor Ramirez
*Assistant Examiner*—Julio C. Gonzalez
(74) *Attorney, Agent, or Firm*—Nixon & Vanderhye P.C.

(57) ABSTRACT

A plane commutator is comprised of a plurality of commutator segments, a plurality of base plate and a resinous boss member. The commutators are made of sintered carbon compound and disposed to provide a plane commutator surface at an end thereof and a base portion at the other end. Each commutator segment has a projection extending from the base portion. The resinous boss member is disposed in contact with the base portion. Each base plate has an engagement hole, to which one of the projections is fitted, and a terminal portion that extends along an outer periphery of the boss member. A powder-accommodation pocket is formed around a foot of each the projection so that the projection can be shaved by a corner edge of the hole. This ensures good contact of the commutators with the metal base plates and provides a sufficient manufacturing tolerance.

20 Claims, 3 Drawing Sheets

PLANE COMMUTATOR OF MOTOR HAVING A BASE MADE OF CONDUCTIVE POWDER

CROSS REFERENCE TO RELATED APPLICATION

The present application is based on and claims priority from Japanese Patent Application 2000-172205 filed Jun. 8, 2000, the contents of which are incorporated herein by reference.

BACKGROUND OF THE INVENTION

1. Field of the Invention

The present invention relates to a plane commutator that has a disk-like commutator surface and a method of manufacturing such a commutator.

2. Description of the Related Art

A plane commutator that has a disk-like flat commutator surface is installed in a motor such as a motor of a motor-integrated fuel-pump unit. The plane commutator is fitted to a rotary shaft of the motor. The plane commutator is comprised of a plurality of commutator segments (generally made of a burnt or sintered carbon) insulated by slits from each other, a plurality of metal base plates, and a resinous boss member. The plurality of the commutator surface forms the flat commutator surface. Each of the commutator segments is connected to one of the metal base plates.

There are two types of the plane commutator. The first type has the metal base plate connected to an end of the commutator and the commutator surface formed at the other end of the commutator. The second type has the metal base plate connected to portions around the same end of the commutator as the commutator surface.

In the first type, it is difficult to mechanically fix the base plates to the commutator due to spring-back force of the base plate. Therefore it is necessary to weld or solder the base plates to the commutator segments while pressing the base plate in the axial direction thereof.

U.S. Pat. No. 5,925,961 or its corresponding Japanese Application, JP-A-10-4653, discloses a method of fixing the base plate to commutator segments of the first type commutator. Each commutator segment has a projection extending in the axial direction from the surface of the commutator opposite the commutator surface. The metal base plate has holes to which the projections are inserted. The holes are thereafter crimped or pressed at the circumference thereof to mechanically fix the base plate to the commutator segments.

However, it is difficult to control the pressing force to provide a desired strength in the disclosed method. If the pressing force is not controlled as desired, the projection may be broken. This is an obstacle to mass-production of the above type of the motors.

SUMMARY OF THE INVENTION

Therefore, a main object of the invention is to provide an improved plane commutator that is easy to manufacture and more reliable.

In a plane commutator according to a feature of the invention is as follows.

A plurality of commutator segments is made of sintered carbon compound and is disposed to provide a plane commutator surface at an end thereof and a base portion at the other end. Each the commutator segments has a projection extending from the base portion. A resinous boss member is disposed in contact with the base portion. A plurality of metal base plates has an engagement hole, to which the projection of one of the commutator segments is fitted and a terminal portion extending along an outer periphery of the boss member. A powder-accommodation pocket is formed around a foot of each the projection.

When the plurality of commutator segments and the plurality of metal base plates are assembled into a unit, each the projection is inserted into an engagement hole and shaved by the engagement hole. The shaved powder shaved off the projection is accommodated in the powder accommodation pocket.

Therefore, the projection and the engagement hole can contact each other very closely, thereby increasing fastening strength as well as reducing electric contact resistance between the commutator segment and the metal base plate.

Each metal base plate may be a press-formed plate that has a dent for accommodating shaved powder formed when the projection is fitted to the engagement hole. Preferably, each engagement hole has a corner edge for shaving an outer periphery periphery of one of the projections, and the edge corner may have a curved surface whose radius is less than 0.2 mm. It is also preferable that the projection has a tapering portion at an edge thereof to insert the projection into the engagement hole more easily.

In the above plane commutator, each commutator segment may be comprised of a commutator surface portion disposed on a side of the commutator surface and a commutator base portion disposed on the side of the projection, and the commutator base portion has a lower electric resistance than the commutator surface portion. The commutator base portion may include metal powder.

Another object of the invention is to provide a new method of manufacturing the above plane commutator.

A method of manufacturing a plane commutator according to another feature of the invention includes a step of extending a projection from each commutator segment, a step of forming an engagement hole at each metal base plate so that the outside diameter of the projection is a prescribed size larger than an inside diameter of the holes, and a step of inserting each projection into the engagement hole to shave an outer periphery of the projection so that the projection can be shaved by an inner periphery of the holes.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
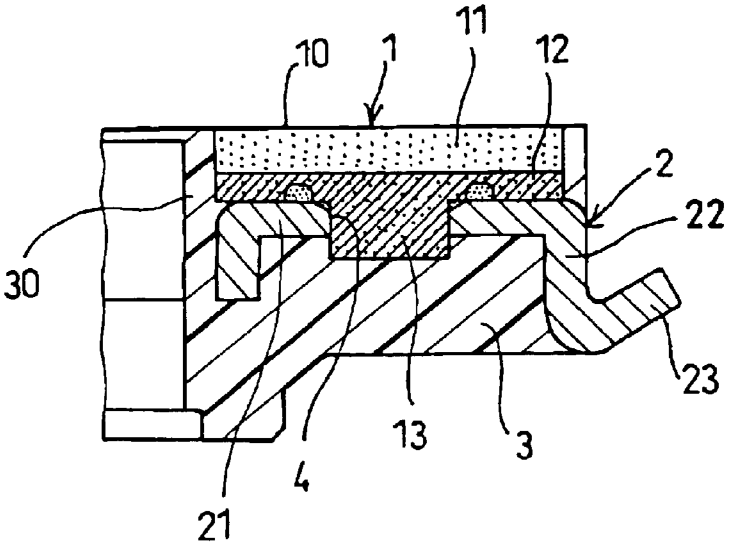
FIG. 1 is a schematic fragmentary cross-sectional side view of a plane commutator according to a first embodiment of the invention.

A plane commutator of a fuel pump motor according to a first embodiment of the invention is described with reference to FIGS. 1–3 and 15. The commutator is comprised of a plurality of commutator segments 1, a plurality of metal base plate 2 and a boss member 3.

The plurality of commutator segments 1 is made of a sintered carbon powder and is aligned into a disk at equal circumferential intervals. The plurality of commutator segments 1, as a whole, has ring-shaped commutator surface 10 at an end. Each commutator segment 1 is comprised of a commutator surface portion 11, a base portion 12 and a projection 13. The commutator surface portion 11 is made of carbon powder and disposed at the commutator surface portion 11, and the base portion 12 and the projection 13 are made of carbon-and-copper-mixed powder. Therefore, the base portion is lower in electric resistance than the commutator surface portion 11. The base portion 12 is disposed at the back of the commutator surface portion 11, and the projection 13 projects backward from the center of the base portion 12.

Each metal base plate 2 has an engagement portion 21, a semi-cylindrical wall portion 22 and a terminal portion 23.

The engagement portion 21 is connected to the base portion 12 of the commutator segment 1, and the wall portion 22 extends radially outward from the engagement portion 21 and bends to extend in the axial direction of the commutator along the outer periphery of the boss member 3. The terminal portion 23 extends from the end of the wall member remote from the commutator surface 10 to be connected by fusing or the like to a wire end of an armature coil (not shown).

The boss member 3 is a resinous disk member that has a shaft hole 30 at the center thereof. The boss member 3 covers surfaces of the engagement portion 21 that are not in contact with the commutator segments 1 and also surfaces of the plurality of commutator segments 1 except for the commutator surface 10 and the side surfaces thereof. The engagement portion 21 of each metal base plate 2 has an engagement hole 4, and the projection 13 is fitted to the engagement hole 4. The engagement hole has a sharp corner edge 6 at an opening adjacent the dent 5. The corner edge 6 has a curved surface having a radius less than 0.2 mm. The upper surface of each engagement portion 21 shown in FIG. 1 is in close contact with the base portion 12 of one of the commutator segments 1 to provide a good electric contact. It is possible to connect the commutator segments 1 and the metal base plates by heating.

A method of manufacturing the above described commutator is as follows.

Figure 2:
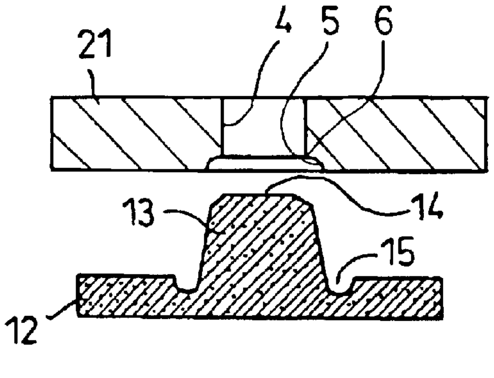
FIG. 2 is a schematic cross-sectional view illustrating a step of assembling a commutator segment and a metal base plate into a unit.

At first, a plurality of commutator segments 1 and a plurality of metal base plates 2 are prepared. The plurality of commutator segments is formed on a disk-shape sintered carbon member. The outside diameter of the projection 13 is a size L larger than the inside diameter of the engagement hole 4. The head 14 of the projection 13 is chamfered or tapered off, as shown in FIG. 2, so that the outside diameter thereof is smaller than the inside diameter of the engagement hole 4. Therefore, the projection 13 can be easily inserted into the engagement hole 4. The base portion 12 has a ring-shaped groove or pocket 15 around the foot of the projection 13.

The plurality of metal base plates 2, which is temporarily connected to each other by connection portions, is press-formed from a plate member. The portions around the engagement holes 4 are dented in the press-forming direction, thereby forming a dent 5.

Figure 3:
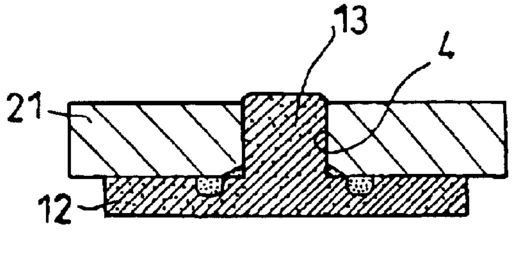
FIG. 3 is a schematic cross-sectional view illustrating the above unit.
Figure 4:
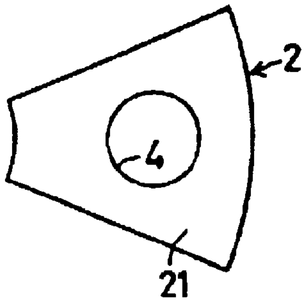
FIG. 4 is a schematic plan view of a metal base plate of a plane commutator according to a second embodiment of the invention.
Figure 5:
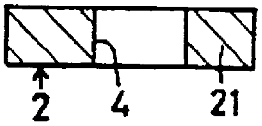
FIG. 5 is a cross-sectional side view of the metal base plate shown in FIG. 4.
Figure 6:
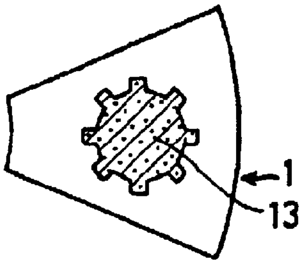
FIG. 6 is a schematic plan view of a commutator segment of the plane commutator according to the second embodiment.
Figure 7:
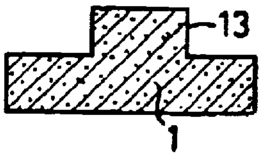
FIG. 7 is a cross-sectional side view of the commutator segment shown in FIG. 6.

Then, the plurality of commutator segments 1 is put above the plurality of metal base plates 2, and each projections 13 is force-fitted into the corresponding engagement hole 4 of the engagement portion 21 until the base portions 12 of the commutator segments 1 and the engagement portions 21 of the metal base plates 2 closely contact each other, as shown in FIG. 3. While each projections 13 is being force-fitted into the engagement hole 4, peripheral portions of the projection 13 are squeezed and shaved off by the sharp corner edge 6, and drop into the pocket 15. The shaved-off powders are also held in the dent around the engagement hole 4 of the metal base plate 2.

This process provides excellent contact of the commutator segments 1 and the metal base plates 2. Since the peripheral portions of the projections 13 are shaved off, the pressing force can be uniformly dispersed. There is little concentration of stress on the commutator segments 1 and the metal base plates 2. This process also provides a large dimensional tolerance for assembling.

Thereafter, a unit of the plurality of commutator segments 1 and the plurality of metal base plates 2 is set into a mold die and is molded with resinous material to form a cylindrical member having the boss member 3. Thus, the engagement portions 21 are embedded into the boss member 3, and the terminal portions 23 are exposed outside from the boss member 3.

Finally, the commutator surface 10 of the cylindrical member is cut in radial directions by a rotating cutter to form slits that separate commutator segments from each other and also cut the temporary connection portions of the metal base members 2.

A commutator according to a second embodiment of the invention is described with reference to FIGS. 4–8.

Figure 8:
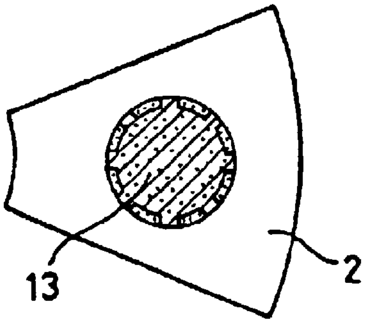
FIG. 8 is a schematic cross-sectional plan view of the commutator segment and the metal base plate shown in FIGS. 4 and 6 fixed in a unit.
Figure 9:
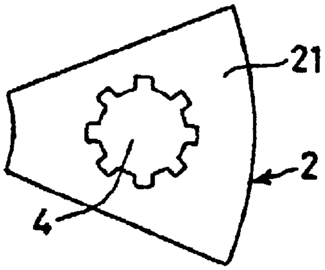
FIG. 9 is a schematic plan view of a metal base plate of a plane commutator according to a third embodiment of the invention.
Figure 10:
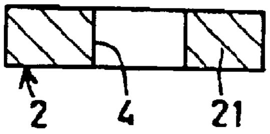
FIG. 10 is a cross-sectional side view of the metal base plate shown in FIG. 9.
Figure 11:
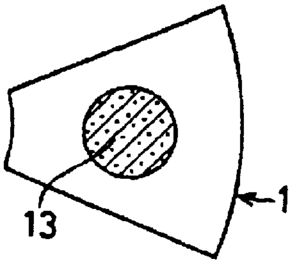
FIG. 11 is a schematic plan view of a commutator segment of a plane commutator according to a third embodiment of the invention.
Figure 12:
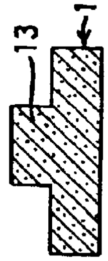
FIG. 12 is a cross-sectional side view of the commutator segment shown in FIG. 11.

Each projection 13 has eight grooves and teeth on the outer periphery thereof, and each engagement portion 21 has a round engagement hole 4. The outside diameter of the grooves is smaller than the inside diameter of the engagement hole 4, and the outside diameter of the teeth is larger than the inside diameter of the engagement hole 4. When the projection 13 is force fitted to the engagement hole 4, the peripheral portions of the teeth are shaved so that the projection 13 and the engagement portion 21 are brought in good contact with each other, as shown in FIG. 8. The shaved powders are accommodated in pockets formed between the engagement hole 4 and the grooves.

A commutator according to a third embodiment of the invention is described with reference to FIGS. 9–13.

Each engagement hole 4 has a spline-shaped hole 4 having eight grooves, instead of round hole, and the projection 13 has a smooth cylindrical surface. The inside diameter of the engagement hole at the grooves is larger than the outside diameter of the projection 13, and the inside diameter thereof at the portions between the grooves is smaller than the outside diameter of the projection 13.

Figure 13:
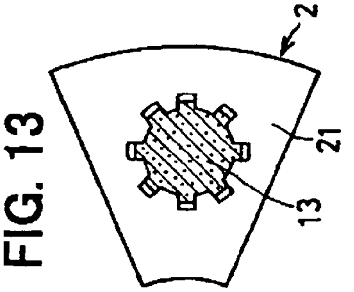
FIG. 13 is a schematic cross-sectional plan view of the commutator segment and the metal base plate shown in FIGS. 11 and 12 fixed in a unit.

When the projection 13 is force-fitted to the engagement hole 4, the peripheral portions of the projection between the grooves are shaved so that the projection 13 and the engagement portion 21 are brought in good contact with each other, as shown in FIG. 13. The shaved powders are accommodated in pockets formed between the engagement hole 4 and the projection 13.

Figure 14:
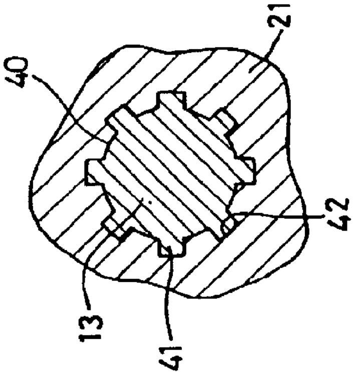
FIG. 14 is an enlarged schematic view of a portion of a commutator segment and a metal base plate of a commutator according to a fourth embodiment of the invention.
Figure 15:
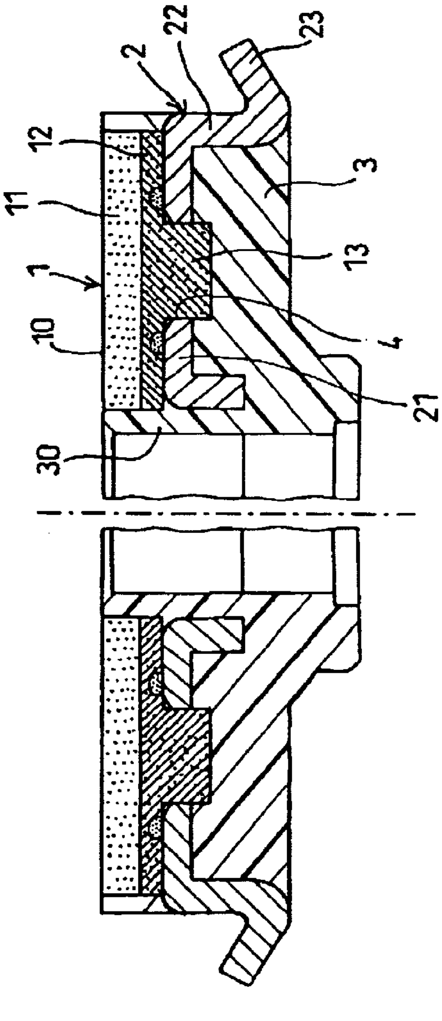
FIG. 15 is a cross sectional view of a plane commutator according to the first embodiment of the invention, showing, inter alia, a plurality of commutator segments.

A commutator according to a fourth embodiment of the invention is described with reference to FIG. 14.

The projection 13 has eight teeth 41 and the engagement portion 21 has a spline-shaped hole 40 having eight grooves 42 respectively fitted to the teeth 41. Thus, each commutator segment 1 is connected to one of the metal base plates 2, and a wide contact surface area of the two members can be provided. The number of teeth and grooves can be changed according to circumstances.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A plane commutator including a plurality of commutator segments providing a flat commutator surface, a plurality of metal base plates, a resinous boss member for holding said commutator segments and said metal base plates;

wherein each of said commutator segments comprises a commutator surface portion for forming a portion of said flat commutator surface at one end thereof, a base portion and a projection projecting from the center of said base portion;

wherein each of said metal base plates has an engagement hole to which said projection is fitted and a terminal portion extending along an outer periphery of said boss member; and wherein said base pardon has a groove for holding powder that comes off said projection around said projection.

2. The plane commutator as claimed in claim 1, wherein each said metal base plate includes a dent for accommodating shaved powder formed when said projection of each said commutator segment is fitted to said engagement hole.

3. The plane commutator as claimed in claim 1, wherein each said engagement hole has an corner edge for shaving an outer periphery of one of said projections.

4. The plane commutator as claimed in claim 3, wherein said corner edge has a curved surface whose radius is less then 0.2 mm.

5. The plane commutator as claimed in claim 1, wherein said projection has a tapering portion at an edge thereof.

6. The plane commutator as claimed in claim 1, wherein each said plurality of commutator segments comprises a commutator surface portion providing said commutator surface and a commutator base portion providing said projection, and said commutator base portion has lower electric resistance than said commutator surface portion.

7. The plane commutator as claimed in claim 6, wherein said commutator base portion includes metal powder.

8. The plane commutator as claimed in claim 1, wherein said groove is a ring-shaped groove.

9. The plane commutator as claimed in claim 1, wherein said groove is formed at a surface of said base portion opposite said metal base plate.

10. The plane commutator as claimed in claim 1, wherein said engagement hole has a dent on a side adjacent said base portion.

11. The plane commutator as claimed in claim 2, wherein the metal base plate is a metal press-formed plate.

12. A plane commutator comprising:

a plurality of commutator segments providing a flat commutator surface;

a plurality of metal base plates; and a resinous boss member for holding said commutator segments and said metal base plates;

wherein each of said commutator segments comprises a commutator surface portion for forming a portion of said flat commutator surface at one end thereof; a base portion and a projection projecting from the center of said base portion;

each of said metal base plates bas an engagement hole to which said projection is fitted and a terminal portion extending along an outer periphery of said boss member; and a space is formed around said projection between each of said metal base plates and the base portion of each of said commutator segments to hold powder that comes off said projection around said projection.

13. The plane commutator as claimed in claim 12, wherein each said engagement hole has an edge corner for shaving an outer periphery of one of said projections.

14. The plane commutator as claimed in claim 13, wherein said edge corner has a curved surface whose radius is less than 0.2 mm.

15. The plane commutator as claimed in claim 14, wherein said projection has a tapering portion a: an edge thereof.

16. The plane commutator as claimed in claim 15, wherein each said plurality of commutator segments comprises a commutator surface portion providing said commutator surface and a commutator base portion providing said projection, and said commutator base portion has lower electric resistance than said commutator surface portion.

17. The plane commutator as claimed in claim 16, wherein said commutator base portion include metal powder.

18. The plane commutator as claimed in claim 12, wherein said space is a ring-shaped groove.

19. The plane commutator as claimed in claim 18, wherein said groove is formed in said base portion opposite said metal base plate.

20. The plane commutator as claimed in claim 12, wherein said engagement hole has a dent on a side adjacent said base portion.

* * * * *